Patented June 28, 1949

2,474,735

UNITED STATES PATENT OFFICE 2,474,735

DEHYDRATION OF COMPOUNDS BY DISTILLATION WITH HYDROPHOBIC OIL

William S. Harmon, Elizabeth, N. J., assignor to Merck & Co., Inc., Rahway, N. J., a corporation of New Jersey No Drawing. Application May 16, 1945, Serial No. 594,169

7 Claims. (Cl. 202—42)

This invention relates to the production of essentially anhydrous crystalline materials from aqueous solutions thereof and in particular to the preparation of slurries comprising finely divided dry, solid reactants admixed with a high-boiling hydrophobic heat-transfer oil.

Various chemical condensations are conveniently conducted by heating a suspension of the dry reactants together in the presence of a high boiling oil which is a non-solvent for the reactants and which acts as the heat-transfer medium, thus avoiding caking and superheating on the walls of the vessel. This method is of particular utility in reactions involving rearrangement or replacement of aromatic sulfonic acid groupings since most of these reactions are customarily carried out under anhydrous conditions and at temperatures in excess of 200° C.

The aromatic sulfonic acids are generally prepared by a sulfonation reaction and the aromatic sulfonic acid is then separated by a conventional method from the excess sulfuric acid as, for example, by diluting the sulfonation mixture with water, treating with lime or barium hydrate to precipitate the insoluble sulfate, followed by filtration thereof. Isolating and drying the very soluble hygroscopic sulfonic acids and their salts present in such aqueous filtrates has always presented a problem in commercial operation. For example, one commercial method for purifying the sulfonation mixture containing pyridine β-sulfonic acid yields an aqueous solution of sodium pyridine β-sulfonate, almost free of sulfate. In order to isolate the dry crystalline aromatic sulfonate in a form suitable for heating with sodium cyanide to convert it to pyridine β-nitrile the aqueous solution is first evaporated to practically solid condition in an evaporator. During the evaporation the solution becomes very viscous which results in poor heat transfer from the walls of the heating vessel to the main body of liquid. The melt obtained is dried on a drum dryer to 2 or 3% moisture content. This product is flashed off and then passed through a rotary dryer whereby the moisture content is reduced to the few tenths of a per cent essential for the desired condensation and thence to a grinder where the dry product is reduced to a fine state of subdivision so as to insure uniform mixture with the other reactants. Failure to remove all the water from the sodium pyridine β-sulfonate results in a portion or all of the sodium cyanide, which is unstable in hot aqueous solution, being decomposed during the heating-up period.

It is now discovered, according to the present invention, that it is possible to avoid this cumbersome drying process and produce an essentially anhydrous sodium pyridine β-sulfonate by adding an aqueous solution of this compound directly to the high boiling hydrophobic heat-transfer oil used for subsequent condensation. The water in the solution is then removed by distillation together with a portion of the oil either by heating the mixture together with good agitation until the water is completely removed or preferably by adding the solution to the hot oil in the form of a fine spray whereby the water is removed concurrently with the addition. If a sufficiently fine spray is used, the water is vaporized instantaneously and before it can penetrate into the body of the oil thereby eliminating objectional foaming, and the product is obtained in a very fine state of subdivision.

Regarded in certain of its broader aspects, the process, according to the present invention, comprises admixing an aqueous solution of a substantially non-volatile chemical compound and a hydrophobic solvent or oil having a boiling point at atmospheric pressure above about 200° C. and which is a non-solvent for said compound, subjecting the mixture thus obtained to conditions of temperature and pressure such that a mixture of said oil and volatile components of said solution is distilled and continuing distillation until substantially all of the volatile components of said solution have been removed, thereby forming a suspension of said compound in the residual oil. If desired, the compound may be isolated directly from the oil by suitable means, oil washed out with a low boiling petroleum ether and the compound dried to produce anhydrous finely divided material.

It will also be noted that an aqueous solution containing two or more essentially non-volatile compounds can be treated, according to the process of the present invention, to produce a mixed slurry of the anhydrous compounds in the hot oil. A special advantage of this adaptation of the process is that intimate mixture of two or more components in very finely divided form is effected directly, thereby avoiding costly drying, grinding, and mixing operations.

Any hydrophobic compound or mixture of compounds, which is liquid at the temperature of admixture with the aqueous solution which has a boiling point above about 200° C. and which is essentially a non-solvent for and is not reactive with the non-volatile components of the aqueous solution may be employed in this process.

Suitable hydrophobic compounds or oils include hydrocarbon solvents such as high-boiling petroleum oil, paraffin, tetraphenyl ethane, tetralin, naphthalene, the diisopropyl benzenes, and the like; halogenated hydrocarbons such as the trichlorbenzenes, the tetrachlorbenzenes, the tribrom toluenes, and the like; nitro compounds such as nitrobenzene, the dinitrobenzenes, the nitrotoluenes, and the like.

Any water soluble compound which is solid and stable at the temperature chosen for the distillation and crystallization may be isolated by this process. The process is especially adaptable to the isolation of water soluble aromatic sulfonates in anhydrous form from their aqueous solutions as, for example, sodium benzene sulfonate, sodium sulfanilate, potassium p-toluene sulfonate, sodium naphthionate, sodium pyridine β-sulfonate, potassium pyridine β-sulfonate, sodium ortho quinoline sulfonate, and the like. Compounds which are themselves unstable in hot aqueous solutions such as sodium cyanide and potassium cyanide can be isolated by this process without appreciable decomposition by controlling the rate of addition of the aqueous solution to insure almost instantaneous removal of the water.

The following examples illustrate methods of carrying out the present invention but it is to be understood that these examples are given by way of illustration and not of limitation.

Example I 450 cc. of an aqueous solution containing about 200 g. of sodium pyridine β-sulfonate is mixed with 250 g. of a petroleum oil (boiling range 400–500° C.). The mixture is heated with agitation to above 100° C., at which temperature a mixture of water and a small amount of oil distills and the sodium pyridine β-sulfonate forms a slurry in the oil. The last of the water does not come off until the temperature reaches approximately 135° C. The slurry is heated to 200° C. at the end of the drying period which insures substantially complete removal of water and produces crystalline material containing less than 2/10% moisture. The slurry is then filtered and the filter cake washed with petroleum ether to recover the essentially anhydrous crystalline sodium pyridine β-sulfonate. Alternatively, sodium cyanide and potassium ferrocyanide are added directly to the slurry and the mixture heated to effect the conversion of the sodium pyridine β-sulfonate to β-cyanopyridine.

Example II 250 g. of a petroleum oil, boiling at 400–500° C., is heated to 200° C. and into this oil is sprayed a fine stream of a 40% aqueous sodium pyridine β-sulfonate solution. A mixture of water and a small amount of oil flashes off as the spray contacts the hot oil and finely divided crystalline sodium pyridine β-sulfonate collects as a slurry in the oil. The sodium pyridine β-sulfonate solution is introduced at such a rate that the temperature of the oil can be maintained constant at approximately 200° C. by means of continuous heating, while at the same time avoiding penetration of the aqueous solution into the body of the oil. (Too fast a rate of feed is easily detected by foaming of the oil due to steam generated beneath the surface.) Sufficient of the solution is added to yield a total of 200 g. of the sodium pyridine sulfonate in approximately 240 g. of residual oil. The dry sodium pyridine β-sulfonate can then be recovered from the oil, or the oil slurry utilized without further treatment for preparing β-cyanopyridine as disclosed in Example I.

Example III

About 250 g. of a petroleum oil, boiling at 400–500° C., is heated to 250° C. and into this oil is introduced as a fine stream or spray a solution of 200 g. of sodium pyridine β-sulfonate, 50 g. sodium cyanide and 75 g. potassium ferrocyanide in approximately 500 cc. of water. The water flashes off at the surface of the oil and the three salts crystallize out to form an anhydrous slurry in the oil. The solution is added at such a rate that the temperature is maintained at about 250° C. with constant heating. When all the solution is added, the temperature is raised to 310° C. whereupon the reaction starts and β-cyanopyridine forms and distills and is collected in a receiver. The temperature is then gradually raised to 375° C. to insure removal of all of the β-cyanopyridine; yield, 70 g.

Modifications may be made in carrying out the present invention without departing from the spirit and scope thereof, and the invention is to be limited only by the appended claims.

What is claimed is:

1. The process that comprises adding an aqueous solution of essentially non-volatile material in the form of a fine spray to a hot hydrophobic oil which has a boiling point in excess of about 200° C., and which is a non-solvent for said material, controlling the rate of addition of said solution, while continuously heating said hydrophobic oil so that a mixture of hydrophobic oil and water from said solution is continuously and instantaneouly distilled, substantially without penetration of water into the body of said oil, thereby forming a finely divided and essentially anhydrous suspension of said material in hydrophobic oil.

2. The process that comprises adding an aqueous solution of an essentially non-volatile compound in the form of a fine spray to a hot hydrophobic oil which has a boiling point in excess of about 200° C. and which is a non-solvent for said compound, controlling the rate of addition of said solution, while continuously heating said hydrophobic oil so that a mixture of hydrophobic oil and water from said solution is continuously and instantaneously distilled, substantially without penetration of water into the body of said oil, thereby forming a finely divided and essentially anhydrous suspension of said compound in hydrophobic oil.

3. The process that comprises adding an aqueous solution of a plurality of essentially non-volatile compounds in the form of a fine spray to a hot hydrophobic oil which has a boiling point in excess of about 200° C. and which is a non-solvent for said compounds, controlling the rate of addition of said solution, while continuously heating said hydrophobic oil so that a mixture of hydrophobic oil and water from said solution is continuously and instantaneously distilled, substantially without penetration of water into the body of said oil, thereby forming a finely divided and essentially anhydrous suspension of said compounds in hydrophobic oil.

4. The process that comprises adding an aqueous solution of sodium pyridine β-sulfonate in the form of a fine spray to a hydrophobic oil which is a non-solvent for sodium pyridine β-sulfonate, has a boiling range of about 400–500° C., and which is heated to about 200° C., controlling the rate of addition of said solution while continuously heating said oil so that a mixture of oil and water from said solution is continuously and instantaneously distilled, substantially without penetration of water into the body of said oil, thereby forming a finely divided and essentially anhydrous suspension of sodium pyridine β-sulfonate in hydrophobic oil.

5. The process that comprises adding an aqueous solution of sodium pyridine β-sulfonate in the form of a fine spray to a petroleum oil which has a boiling range of about 400–500° C. and which is heated to about 200° C., controlling the rate of addition of said solution while continuously heating said oil so that a mixture of oil and water from said solution is continuously and instantaneously distilled, substantially without penetration of water into the body of said oil, thereby forming a finely divided and essentially anhydrous suspension of sodium pyridine β-sulfonate in petroleum oil.

6. The process that comprises adding an aqueous solution having solute components consisting of sodium pyridine β-sulfonate, potassium ferrocyanide and sodium cyanide in the form of a fine spray to a hydrophobic oil which is a non-solvent for said solute components, has a boiling range of about 400–500° C. and which is heated to about 200° C., controlling the rate of addition of said solution while continuously heating said oil so that a mixture of oil and water from said solution is continuously and instantaneously distilled, substantially without penetration of water into the body of said oil, thereby forming a finely divided and essentially anhydrous suspension of said solute components in hydrophobic oil.

7. The process that comprises adding an aqueous solution having solute components consisting of sodium pyridine β-sulfonate, potassium ferrocyanide and sodium cyanide in the form of a fine spray to a petroleum oil which has a boiling range of about 400–500° C., and which is heated to about 200° C., controlling the rate of addition of said solution while continuously heating said oil so that a mixture of oil and water from said solution is continuously and instantaneously distilled, substantially without penetration of water into the body of said oil, thereby forming a finely divided and essentially anhydrous suspension of said solute components in petroleum oil.

WILLIAM S. HARMON.

REFERENCES CITED

The following references are of record in the file of this patent:

UNITED STATES PATENTS

| Number | Name | Date |
|---|---|---|
| 1,549,885 | Littman | Aug. 18, 1925 |
| 1,989,541 | Blanchod | Jan. 29, 1935 |
| 2,058,435 | Fisher | Oct. 27, 1936 |
| 2,138,048 | Vesce | Nov. 29, 1938 |
| 2,144,654 | Guthman | Jan. 24, 1939 |
| 2,264,759 | Jones | Dec. 2, 1941 |
| 2,326,099 | Kokatnur | Aug. 3, 1943 |
| 2,360,156 | Wyler | Oct. 10, 1944 |

OTHER REFERENCES

Maier, "Das Pyridine und Siener Derivatives," pages 206 and 207. Copy in Div. 59.

Othmer, "Industrial and Engineering Chemistry," Sept. 1941, page 1106.